United States Patent [19]

Connelly et al.

[11] 4,374,102

[45] Feb. 15, 1983

[54] POLYMERS FOR CONTROLLING SODA ASH CRYSTAL FORMATION

[75] Inventors: Lawrence J. Connelly, Oak Lawn, Ill.; James Kane, Sandy, Utah; R. James Shields, Warrenville, Ill.

[73] Assignee: Nalco Chemical Company, Oak Brook, Ill.

[21] Appl. No.: 321,288

[22] Filed: Nov. 13, 1981

[51] Int. Cl.³ ............................ C01D 7/00; C01D 7/40
[52] U.S. Cl. ................ 423/206 T; 23/302 T; 423/266; 423/421
[58] Field of Search ............. 423/265, 266, 206 T, 423/421; 23/300, 302 T

[56] References Cited

U.S. PATENT DOCUMENTS

| | | | |
|---|---|---|---|
| 3,037,849 | 6/1962 | Frint et al. | 423/206 T |
| 3,233,983 | 2/1966 | Bauer et al. | 23/302 T |
| 3,288,770 | 11/1966 | Butler | 526/212 |
| 3,663,461 | 5/1972 | Witt | 23/302 T |
| 3,711,573 | 1/1973 | Nagy | 23/302 T |
| 3,796,794 | 3/1974 | ILardi | 423/206 T |
| 3,915,904 | 10/1975 | Tonkyn et al. | 23/302 T |
| 3,981,686 | 9/1976 | Lobunez et al. | 423/206 T |
| 4,183,901 | 1/1980 | ILardi et al. | 423/206 T |

FOREIGN PATENT DOCUMENTS 731212 3/1966 Canada .

*Primary Examiner*—Gary P. Straub
*Attorney, Agent, or Firm*—John G. Premo; Robert A. Miller

[57] ABSTRACT

Poly N,N-dimethylaminomethyl acrylamide, when added to clarified trona solutions, improves the crystals subsequently formed from these solutions. Preferably, the poly N,N,-dimethylamino methyl acrylamide crystal modifier is used in conjunction with a water-soluble cationically charged coagulant.

5 Claims, 1 Drawing Figure

POLYMERS FOR CONTROLLING SODA ASH CRYSTAL FORMATION

INTRODUCTION

Soda ash, sodium carbonate, occurs naturally as trona, sodium sesquicarbonate, and is found in underground deposits at Wyoming and in lake brines at Searles Lake, Calif. In the U.S. soda ash is used primarily for glass and chemical production.

Soda ash is produced by the natural carbonate monohydrate and sesquicarbonate processes, the synthetic Solvay Process, and solar evaporation of lake brines. Although the Solvay Process dominated production ten years ago, less than 10% of the U.S. soda ash is produced by this method today, due to its high energy cost and pollution control difficulties. Of the remainder, over 80% is produced by the sodium carbonate monohydrate and sesquicarbonate processes in Wyoming.

The main processing steps common to both natural processes are:

1. Dissolution of the sodium carbonates in the ore;
2. Clarification and filtration of the resulting liquor to remove both organic and inorganic impurities;
3. Concentration and crystallization of the liquor to precipitate sodium carbonates; and,
4. Dewatering and drying of the precipitate to form anhydrous soda ash.

In the sodium carbonate monohydrate process, the trona is calcined to convert it from crude sodium sesquicarbonate to the more soluble sodium carbonate monohydrate before the dissolution step. In other respects, however, the process is very similar to the sodium sesquicarbonate process.

In the sodium sesquicarbonate process, trona is prepared for dissolution by crushing and screening. In the sodium carbonate monohydrate process crushing and screening are followed by calcining at 150°–200° C. to convert sodium sesquicarbonate to sodium carbonate monohydrate. Higher temperatures would burn off more undesirable organics in the ore, but would also form sodium silicates by reaction between soda ash and clays in the ore.

In the monohydrate process, the calcined ore can be dissolved (leached) quite easily in ambient thickener overflow and make-up water. In the sesquicarbonate process, however, the trona must be dissolved in boiling "mother liquor" in a series of well agitated dissolvers. This is required because of the relatively low solubility of the sodium sesquicarbonate.

Clarification and Filtration

The dissolver effluent, typically with 1–2% suspended solids, is pumped to the clarifier, a first clarification stage for settling of clay, shale and other insoluble impurities. Wyoming trona averages about 35% insoluble by weight.

The clarifier overflow is pressure-filtered and treated with activated charcoal to remove organic matter. Organic loading in the "mother liquor" must be minimized because it causes foaming in the crystallizers and also effects crystal growth. It is also necessary to maintain a low level of sulfide ion, since the corrosive "mother liquor" would attack equipment and contaminate the product with unwanted metals.

The underflow from the clarifier is pumped to the thickener, a second clarification stage, to achieve further compaction of the insoluble mud. In the sesquicarbonate process, the clarifier underflow will be diluted with make-up water before thickening to improve mud-washing. In both processes, the main objective is to achieve maximum underflow compaction (minimum liquor) in the thickener underflow, so that carbonate losses are minimized.

In the clarifier, the primary needs are low suspended solids in the overflow to maximize filter capacity, and high underflow compaction to minimize the quantity of liquor reporting to the thickener with the mud, thereby reducing the amount of soluble sodium carbonates that must be washed from the mud at this stage. If the clarifier is undersized, increasing settling rate will also be important, since this will effectively increase clarifier capacity. Guar gum and high molecular weight anionic flocculants are used for clarifier application. In some cases, a low molecular weight cationic polymer will be used to improve overflow clarities.

In the thickener, underflow compaction is the primary concern. If underflow compaction is increased to the limit that can be handled by the underflow pumps, soluble sodium carbonate losses to the tails will be minimized. Guar gum and high molecular weight anionic flocculants are used for thickener application, although none of these will increase underflow densities to thickener design limits.

Concentration and Crystallization

To concentrate the clear liquor and precipitate sodium carbonates, the feed is passed through triple effect evaporators (crystallizers). Crystal growth occurs in the circulated suspension (magma) as it is concentrated and cooled in stages. To prevent build-up of organic matter and silica in the overall process, 25–100 gpm of liquor, depending on plant size, will be continuously purged from the crystallizers.

In the crystallizers, antifoams are sometimes used which help improve crystal growth, as well as control foam. These materials are usually simple surfactants.

Dewatering and Drying

After precipitation is completed, the crystal slurry is concentrated in cyclones or thickeners, and dewatered in continuous centifuges. The "mother liquor" is then recycled back to the process and the crystals washed with water and routed to the calciners. In calcining, sodium sesquicarbonates and carbonate monohydrates are converted to anhydrous sodium carbonate.

Additional descriptions of the production of soda ash from trona may be found in Kirk-Othmer Encyclopedia of Chemical Technology, second edition, Volume 18, pages 458–465.

THE DRAWINGS

THE INVENTION

Figure 1:
FIG. 1 shows crystals formed from a clarified trona solution without benefit of any additives.

An improved process for crystallizing clarified aqueous trona solutions which comprises adding to these solutions prior to crystallization at least 3 ppm of a poly N,N-dimethylaminomethyl acrylamide.

The Poly N,N-dimethylaminomethyl Acrylamide

The poly N,N-dimethylaminomethyl acrylamide is produced by reacting acrylamide polymers with formaldehyde and dimethylamine to produce a Mannich polyacrylamide. The Mannich reaction with formaldehyde and secondary amines is well known. See, for instance, the Suen article, "Ionic Derivatives of Polyacrylamide," *Industrial & Engineering Chemistry*, Dec., 1956, p. 2132.

Poly N,N-dimethylaminomethyl acrylamide may also be produced by reacting acrylamide with formaldehyde and dimethylamine and subsequently polymerizing the thus-reacted acrylamide. While this method may be used to produce polymers of the invention, it is not a preferred mode.

The poly N,N-dimethylaminomethyl acrylamide should have a molecular weight within the range of about 200,000 up to about 5,000,000 with a preferred molecular weight range being 200,000–1,500,000. Most preferred polymers have molecular weights slightly below 1,000,000.

Dosage

The dosage at which the poly N,N-dimethylaminomethyl acrylamide produce improved crystallization of clarified trona solutions may vary. It has been found that minimum dosage is about 3 ppm, based on the weight of the solution treated, up to as high as several hundred ppm. Preferred dosage range is within the range of 20–100 ppm.

Point of Addition of the Poly N,N-dimethylaminomethyl Acrylamide

Trona solutions are conventionally clarified using anionic polymers. Typical anionic polymers are copolymers of acrylamide and acrylic acid. These polymers, when used to clarify trona solutions, sometimes act as crystallization inhibitors.

When the crystallization aids of the invention are added to liquors which contain acid anions they form complexes and their effectiveness tends to be diminished. Since the crystallization aids of the invention may be added to the trona liquor at any point in the system and at any time prior to crystallization, it is important that they be free of the complex formation described. Therefore, we have found that it is beneficial if the clarification agent be cationic in nature. To this end, we prefer to use cationic clarification aids, such as, for instance, polydiallyldimethylammonium chloride (poly-DADMAC).

There is no preferred place for addition of the crystallization aid except that it is convenient to add it to the trona solutions prior to their reaching the crystallizers. Therefore, they may be added either before the clarifiers or to the clarifiers. Any point in the process which allows good mixing of poly N,N-dimethylaminomethyl acrylamide and, also, allows poly N,N-dimethylaminomethyl acrylamide to be present during the crystallization, is acceptable.

Use of Cationic Coagulants in Conjunction With Poly N,N-dimethylaminomethyl Acrylamide The invention, in one of its preferred modes, contemplates using as a clarification aid or coagulant, certain cationic polymers. Examples of cationic coagulants such as those described in Canadian Pat. No. 731,212, which is hereinafter incorporated by reference, include hydrophilic condensation type polymers. The most preferred hydrophilic condensation polymer is one derived by the reaction of a polyalkylene polyamine with a polyfunctional halohydrin polymer. The resultant polymer is sufficiently hydrophilic so as to be soluble in water at the effective concentration.

The hydrophilic alkylene polyamine polyfunctional halohydrin polymers are reaction products of alkylene polyamines with polyfunctional halohydrins such as dihalohydrin, e.g., alphadichlorohydrin, dibromohydrin, or diiodohydrin, or any of the corresponding monohalohydrins containing a second functional group capable of reacting with an amino nitrogen atom of the alkylene polyamino, such as, for example, epichlorohydrin, epibromohydrin, and the like. These polymers may be considered as cationic materials.

The alkylene polyamines which are reacted with the polyfunctional halohydrins for the purpose of the invention are well-known compounds having the general formula:

$$H_2N(C_nH_{2n}NH)_xH$$

where n is an integer and x is one or more. Examples of such alkylene polyamines are the alkylene diamines, such as ethylene-diamine, 1,2-propylene diamine, 1,3-propylene diamine, and the polyalkylene polyamines, such as, for example, diethylenetriamine, triethylenetetramine, tetraethylenepentamine, dipropylenetriamine, and the similar polypropylene polyamines and polybutylene polyamines.

It has been known for many years that polyfunctional halohydrins react with amines including polyamines to form both monomeric and polymeric reaction products. The first stage of the reaction apparently results in the condensation of the halohydrin with the amine to produce a simple monomer. Thus, one mole of epichlorohydrin probably reacts with one mole of diethylenetriamine according to the following equation:

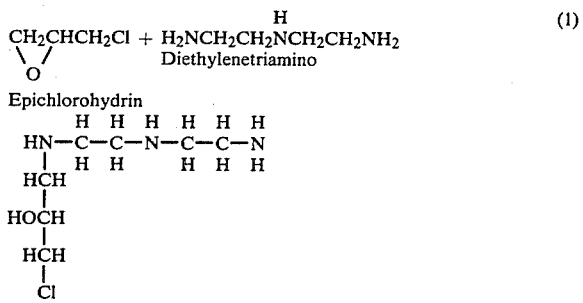

(1)

Obviously, the epichlorohydrin can react with both primary amino groups and also with the secondary amino group in the diethylenetriamine and it is possible for some or all of these reactions to take place simultaneously. Furthermore, the simple mer unit indicated as the end product of equation (1) can react with other similar units to produce polymers containing recurring units. If the reaction is carried far enough, crosslinkage can occur, which is evidenced by gel formation. For purpose of the present invention, however, it is essential to avoid water-insoluble resin or gel formation. Yet the condensation-polymerization must be carried sufficiently far to thicken or increase the viscosity of the resultant product but insufficiently far to produce a water-insoluble gelatinous product.

The hydrophilic condensation type polymers of the type illustrated above employed for the purpose of the invention are of a relatively high molecular weight, which is believed to be in excess of 1000 and in most cases greater than 2000. Because of the difficulty of determining molecular weight, the most satisfactory way of ascertaining the proper amount of condensation and polymerization to obtain optimum results in coagulation is by viscosity measurement. The products which have been found to be especially suitable for the practice of the invention have a minimum viscosity of about 7 centipoises in an aqueous alkaline (about 12.6 pH) solution containing 20% by weight of the condensation polymer at a temperature of 75° F. The upper limit of the viscosity is anything short of gel formation and may be, for example, up to 150–200 centipoises. However, the preferred range of viscosity is about 14–90 centipoises.

Aqueous solutions of the condensation polymers are normally alkaline in pH. Stable solutions have been prepared having a pH range within the range of 7.6 to 13.0. The preferred pH range is from 10.5 to 12.8 with the most preferred range being from 11.7 to 12.6. pH ranges above 10.5 are not corrosive to steel shipping containers. The higher pH ranges above 10.5 are obtained by adding a caustic alkali (e.g., NaOH or KOH) to the condensation polymer. It has been observed that viscous polymers, alkaline in pH, could oftentimes be substantially reduced in their viscosity by treatment with mineral acids.

The dosage of the alkylene polyamine-polyfunctional halohydrin condensation polymer will vary depending upon the particular type of system to be treated. For example, if 8 ppm is the optimum dosage in some instances poor results will be obtained with 16 ppm or 2 ppm. High dosages may be particularly ineffective and may have a dispersing rather than a coagulation effect. The final effective dosage may be found to be as low as 0.25 ppm. Thus, it is essential to make preliminary tests in order to determine the optimum dosage.

For convenience, the condensation polymer is preferably prepared at a concentration of around 40% and then diluted with water to a concentration of about 20% polymer solution. A 20% solution may increase very slightly in coagulation activity upon aging, but a very dilute solution (e.g., 0.35% solution) displays no noticeable change in activity upon aging. For practical purposes, it is desirable to use the polymer as a 20% solution because this concentration is sufficiently high to avoid shipping large quantities of water and sufficiently low to permit accurate proportioning of the correct amounts. Such solutions are also stable for relatively long periods of time.

The relative proportions of polyamine and polyfunctional halohydrin employed in making polyamines for the purpose of the invention can be varied depending upon the particular type of polyamine and polyfunctional halohydrin and the reaction condition. In general, it is preferable that the molar ratio of the polyfunctional halohydrin to polyamine be in excess of 1:1 and less than 2:1. Thus, in the preparation of a condensation polymer solution from epichlorohydrin and tetraethylenepentamine, good results have been obtained at a molar ratio to 1.4:1 to 1.94:1.

In addition to the above preferred condensation type polymer, many other condensation type polymers are also admirably suited for use in the invention. Several illustrative classes of polymers are set forth below:

A. Hydrophilic Amine-Aldehyde and Amide-Aldehyde Polymers or Resins

Effective water-soluble polymers or resins are to be found among the class consisting of cationic amine-aldehyde resins and amide-aldehyde resins, preferably hydrophilic melamine-formaldehyde resins or hydrophilic urea-formaldehyde resins.

These cationic resins are resinous materials carrying a positive electrical charge when in aqueous solution. For example, cationic melamine-aldehyde resins are resinous materials containing melamine and carrying a positive electrical charge when in aqueous solution.

Colloidal resin solutions may be prepared by dissolving ordinary melamine-aldehyde condensation products, such as methylol melamines, in acids such as hydrochloric acid, to form acidified or acid-type resin solutions having a glass electrode pH value within the range of about 0.5 to about 3.5 when measured at 15% solids, or pH values up to 4.5 when measured in more dilute solutions, followed by aging to the colloidal condition, as described in U.S. Pat. No. 2,345,543.

Another class of cationic melamine-aldehyde resins that may be used in practicing the present invention are the resinous copolymers of melamine, urea and aldehydes such as formaldehyde containing at least 0.7 moles of melamine for each 4 moles of urea and about 1 to 4 moles of combined formaldehyde for each mole of melamine plus urea. Such resins are described in U.S. Pat. No. 2,485,079. These cationic melamine resin copolymers are obtained by first preparing an acidified aqueous solution of an aldehyde condensation product of melamine and urea containing 1 to 70 mole percent of urea and 30 to 99% of melamine and about 0.2 to 1.5 moles of acid per mole of melamine, depending on the strength of the acid, and aging the solution until the colloidal cationic condition is reached.

Water-soluble polyamines and polyimes may also be used as cationic coagulants in this invention.

These polymers are condensation products of either (a) diahaloalkanes and ammonia, (b) autocondensation products of alkyleneimines or (c) condensation products of polyalkylene polyamines and formaldehyde.

The condensation products of ammonia and alkylene dihalides such as ethylene and propylene dichloride produces a series of polyalkylene polyamines which are well-known and commercially available materials. Such chemicals are exemplified by the compounds: Ethylene diamines, diethylenetriamine, triethylenetetramine and tetraethylenepentamine. The higher alkyl homologues and crude mixtures of several of these amines are also included as materials capable of use in the invention.

The polyimines are derived, for example, by the homopolymerization of monomers containing the imino radical,

and have a molecular weight of at least 1000.

The monomers preferably employed contain not more than 7 carbon atoms. Of the monomers employed for making polyimines, some of those best suited for the purpose of the invention are classified as substituted ethyleneimines and have the structural formula:

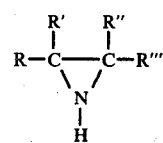

wherein R, R', R''' are either hydrogen or acyclic hydrocarbon radicals containing from 1 to 3 carbon atoms.

Examples of such monomers are the following:

A. Ethyleneimine - 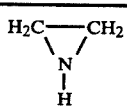

B. 1,2-propyleneimine 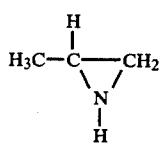

C. 1,2-butyleneimine - 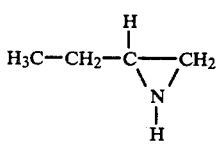

D. 2,2-dimethyl-ethyleneimine 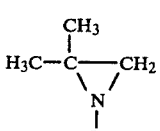

E. 2,3-butyleneimine - 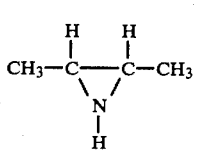

F. 1,1-dimethyl, 2-n-propylethyleneimine 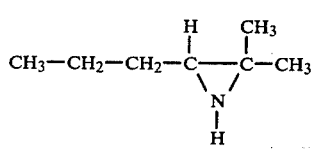

Other monomers capable of producing polymers suitable for the practice of this invention are trimethyleneimine which has the structural formula:

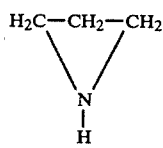

and its lower alkyl substituted derivatives in which one or more of the hydrogen atoms attached to a carbon atom is substituted by an alkyl group containing not more than 3 carbon atoms, i.e., methyl, ethyl, and propyl.

Ethyleneimine, as well as many of its derivatives, may be prepared by any of several well-known methods such as are described in the "Journal of American Chemical Society", Vol. 57, p. 2328, (1935) and Bor. 21 1094 (1888).

The polymerization of ethyleneimine and its derivatives is usually conducted at reduced temperatures using acid catalysts such as HCl and the like. The polymerization of the various monomers listed above is described in detail in the "Journal of Organic Chemistry", Vol. 9, p. 500, (1944).

The linear polyimines are characterized by a long acyclical chain structure in which nitrogen atoms of amine groups are connected at intervals to carbon atoms. It will be recognized, therefore, that linear polyimines can be prepared not only by homopolymerization but also by condensation reactions with the elimination of a hydrohalide. Thus, ethylene dibromide or propylene dibromide can be condensed with diethylenetriamine, triethylenetetramine, tetraethylenepentamine, and/or dipropylenetriamine to produce polyimines, and the present invention contemplates the employment of such materials as coagulants.

In general, the polyimines employed in the practice of the invention can be described as water-soluble polyimines in which imino (—NH) groups are attached to carbon atoms and recur every two to three atoms in a main linear chain, preferably containing not more than 6 carbon atoms in any side chain. Where the imino groups are separated from each other by ethylene groups, the linear polyimines are referred to as polyethyleneimines. Where the imino groups are separated from each other by propylene groups, the linear polyimines are referred to as polypropyleneimines.

The molecular weight of the useful polymer should be at least 1000 and is preferably from 5000 to 50,000. If the condensation reactions from which these polymers are derived are allowed to continue for too long a period of time or the conditions are not suitable, infusible, water-soluble resins may result. In the case of 2,2-dimethylethyleneimine, care must be used to control the reaction so that the materials produced are water-soluble enough to be soluble at the effective concentrations.

Similarly, long chain water-soluble polymers may be prepared by condensing formaldehyde with a polyalkylene polyamine such as tetraethylenepentamine to link the polyamines with a plurality of methylene bridges.

The above type condensation polymers may be generally described as water-soluble cationic polymers containing a plurality of cationic sites in a straight or branched or chain configuration. In addition to these cationic polymers, other suitable organic cationic coagulants may be used in practicing the invention. Of these, the most important is a class of compounds known generally as onium compounds. These onium compounds useful as coagulants are generally described as alkyl or aralkyl substituted quaternary onium compounds containing at least one acyclic hydrocarbon group of at least 9 carbon atoms in chain length.

The cationic substituted quaternary onium compounds and their use as coagulants are described in U.S. Pat. No. 2,236,930, the disclosure of which is incorporated herein by reference. The preferred quaternary onium compounds are the quaternary ammonium compounds. Several commercially available quaternary ammonium compounds are: soya-trimethylammonium chloride, dimethyl ammonium chloride, tallow trimethyl ammonium chloride, lauryl trimethyl ammonium chloride, stearyl trimethyl ammonium chloride, and coconut trimethyl ammonium chloride. These compounds are manufactured and sold by the Armour Chemical Division under the tradename "Arquada."

A particularly useful coagulant or clarification aid is polydiallylammonium chloride. These polymers are described in U.S. Pat. No. 3,288,770, Butler, which is hereinafter incorporated by reference.

The dosage of the cationic coagulant may range from as little as 5 ppm, based on the weight of the liquor, up to as much as 500–800 ppm. It is believed that the combination of the cationic coagulant in conjunction with poly N,N-dimethylaminomethyl acrylamide contributes to the improved crystal formation achieved by the practice of the invention.

When the poly N,N-dimethylaminomethyl acrylamide is used as the crystallization aid in conjunction with cationic polymers such as polydiallyldimethylammonium, the ratios between cationic coagulant and the polydiallyldimethylammonium should be at least 2:1.

Crystallization of the Clarified Trona Solution

Depending upon the makeup of a particular trona solution prior to clarification, it will either be a bad or a good solution. A good solution is one which, after clarification, will produce large, uniform crystals. A poor solution, after clarification, produces fine, needle-like crystals which are not sufficiently dense to allow packing within standard containers. The invention and its additives allow bad solutions to produce good crystals.

Specific Advantage of the Invention

A very specific advantage of the invention which is not related directly to crystal improvement is the fact that poly N,N-dimethylaminomethyl acrylamide tends to diminish foaming in the crystallizers which is a problem often requiring the use of foam suppressing chemicals, such as, simply, hydrophobic surfactants. Thus, the invention provides a partial solution to the foaming problem and also allows the production of large, uniform crystals.

Illustration of the Invention

In these tests, an actual filtered plant trona solution was used. A laboratory sample of this clarified liquor was treated with the additive of the invention. Crystals of soda ash were added to promote crystallization which was allowed to occur. They were then dewatered and dried using conventional means. Crystals were observed under a light microscope at a 50X magnification. A similar test was run without using the additives of the invention. The results are shown in the Drawings.

Figure 2:
FIG. 2 shows crystals formed from the same clarified trona solution, using an additive of the invention.

FIG. 1 shows crystals formed without the use of the additive. FIG. 2 shows that 80 ppm of poly N,N-dimethylaminomethyl acrylamide, molecular weight of about 750,000, as producing superior large, uniform crystals. It should be noted that the liquor contained, prior to being treated with the crystal modifier of the solution, about 300 ppm of a polydiallyldimethylammonium which had a molecular weight of about 150,000.

The trona solutions referred to herein include solutions of soda ash and sodium carbonate monohydrate produced from trona ore.

We claim:

1. An improved process for crystallizing clarified aqueous trona solutions which comprises adding to these solutions prior to crystallization at least 3 ppm of a poly N,N-dimethylaminomethyl acrylamide.

2. The process of claim 1 where the aqueous trona solutions have been clarified with a water-soluble polymeric cationic coagulant.

3. The method of claim 2 where the cationic coagulant is polydiallyldimethyl ammonium chloride.

4. The method of claim 3 where the weight ratio of polydiallyldimethyl ammonium chloride to poly N,N-dimethylaminomethyl acrylamide is at least 2:1.

5. An improved process for crystallizing clarified aqueous trona solutions which comprises adding to these solutions prior to crystallization from between 3 to several hundred ppm of poly N,N-dimethylaminomethyl acrylamide.

* * * * *